UNITED STATES PATENT OFFICE.

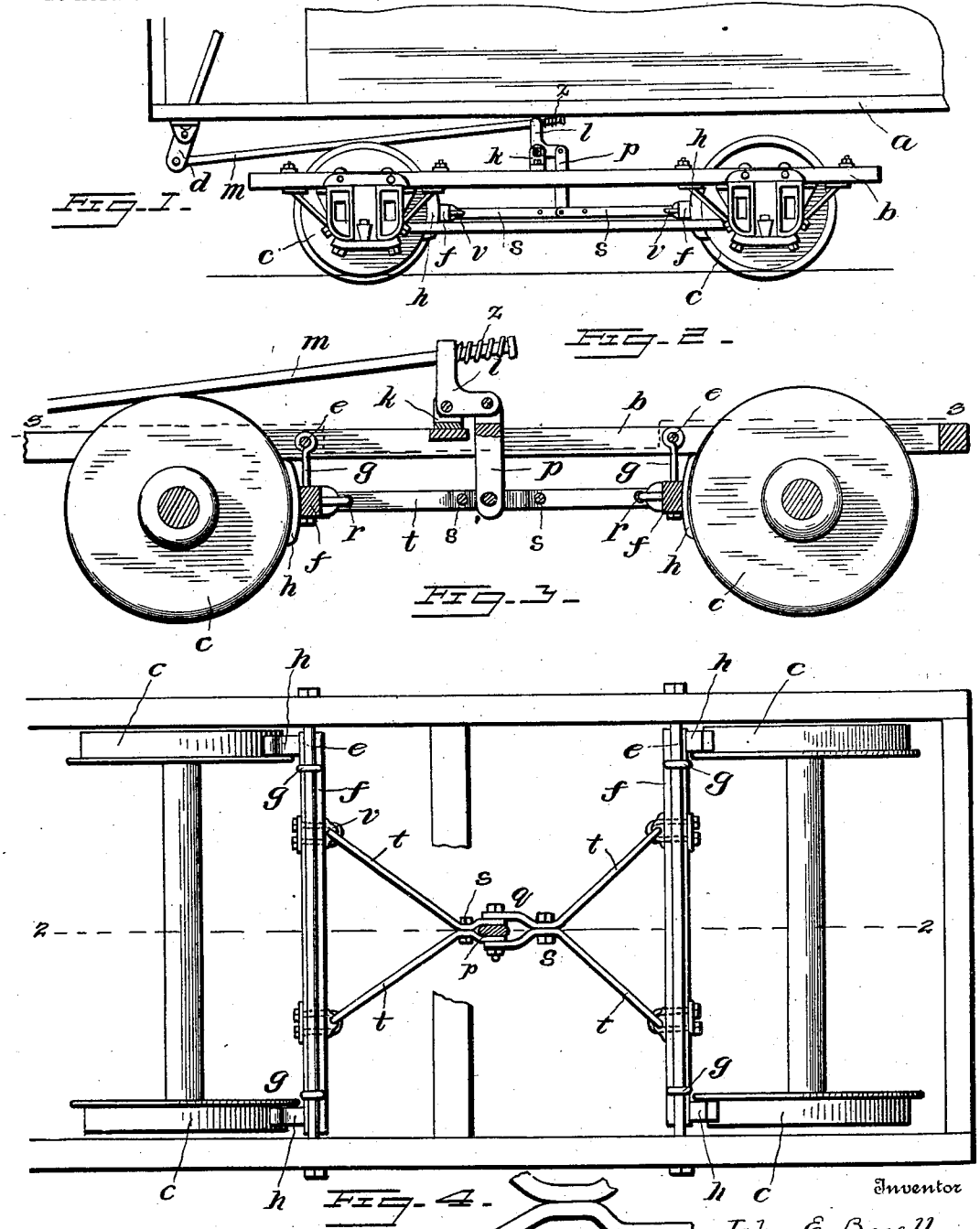

JOHN E. BOZELL, OF ANDERSON, INDIANA.

BRAKE FOR RAILROAD-CARS.

SPECIFICATION forming part of Letters Patent No. 723,642, dated March 24, 1903.

Application filed November 19, 1902. Serial No. 132,015. (No model.)

*To all whom it may concern:*

Be it known that I, JOHN E. BOZELL, a citizen of the United States, and a resident of Anderson, in the county of Madison and State of Indiana, have made a certain new and useful Invention in Brakes for Railroad-Cars; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a side elevation of my invention as applied. Fig. 2 is a section on the line 2 2, Fig. 3. Fig. 3 is a section on the line 3 3, Fig. 2. Fig. 4 is a detail plan view showing the connection of bar *t* with loop *v*.

The invention relates to brakes for railway-cars; and it consists in the novel construction and combinations of parts, as hereinafter set forth.

In the accompanying drawings the letter *a* designates the bottom of a car, and *b* the wheel-frame or truck below the same. The wheels are indicated at *c*, and *d* represents an operating-lever, or a shaft may be employed instead of a lever for putting on the brakes. Transverse the frame *b* are rods or bars *e*, whereby the transverse brake-bars *f* are suspended by means of links *g* of short length. To the brake-bars are secured the brake-shoes *h*.

To a middle bearing *k* of the frame *b* is pivoted an angle-lever *l*, the vertical arm of which is connected to the operating-lever *d* by means of a connecting-rod *m*, which if a turning shaft is employed instead of a lever should have a short winding-chain attached to its end. To the horizontal arm of the angle-lever is pivoted the short vertical connecting rod or bar *p*, which extends downward from said arm and has its lower end located between the cheeks of the pivot-seats *q* of the horizontally-extending bifurcated push-bars *s s*, which are respectively connected to opposite brake-bars *f*, these being arranged, respectively, in braking relation to the front and rear wheels of the truck. The pivot-holes *r* of the pivot-seats of the push-bars are slightly enlarged with reference to the pivot-bolt in order to allow a slight lateral pivotal motion. The branches *t* of the push-bars *s* diverge toward the brake-bars *f*, against which their ends abut about half-way between the middle and ends of said brake-bars, to which the ends of said branches are connected by strong loops *v*. These bifurcated push-bars are made very strong, and when they are lifted by means of the angle-lever and its connections they tend to straighten between the brake-bars toward or into the horizontal plane, thereby exerting a powerful pushing action against the brake-bars, and because of the slight lateral pivotal motion allowed when the push-bars are pivoted together all the four brake-shoes are put in powerful action at once in an equalized manner. In order to take the brakes off, the operating-lever is loosened and then the weight of the push-bars and connections to the angle-lever cause the push-bars to drop at the point when they are pivoted together, thus pulling the brake-bars toward each other.

In order that the brakes shall be applied in a graduated manner to avoid undue shock, the connecting-bar to the angle-lever is provided with a spring-cushion *z*, which is designed to take up the initial strain.

The bifurcated push-bars are usually made each of two bars wrought in form and riveted together, as indicated in the drawings.

Having described this invention, what I claim, and desire to secure by Letters Patent, is—

A railway-car brake, the combination with the truck-frame, and operating-lever, of the transverse rods of the truck-frame, the opposite brake-bars linked to such rods, the angle-lever and its connection to the operating-lever, the cushion-spring of this connection, the vertical connection of the angle-lever and the bifurcated push-bars connected to, and engaging the brake-bars, and pivoted loosely together and to said vertical connection, substantially as specified.

In testimony whereof I affix my signature in presence of two witnesses.

JOHN E. BOZELL.

Witnesses:
MARCELLUS A. CHIPMAN,
D. C. CHIPMAN.